United States Patent
Nallapareddy et al.

(10) Patent No.: US 10,423,434 B2
(45) Date of Patent: Sep. 24, 2019

(54) LOGICAL PORT AUTHENTICATION FOR VIRTUAL MACHINES

(71) Applicant: Nicira, Inc., Palo Alto, CA (US)

(72) Inventors: Maheedhar Nallapareddy, Newark, CA (US); Akshay Katrekar, Mountain View, CA (US)

(73) Assignee: Nicira, Inc., Palo Alto, CA (US)

( * ) Notice: Subject to any disclaimer, the term of this patent is extended or adjusted under 35 U.S.C. 154(b) by 343 days.

(21) Appl. No.: 15/387,828

(22) Filed: Dec. 22, 2016

(65) Prior Publication Data

US 2018/0181417 A1 Jun. 28, 2018

(51) Int. Cl.
| | |
|---|---|
| G06F 9/455 | (2018.01) |
| H04L 29/06 | (2006.01) |
| G06F 21/30 | (2013.01) |
| G06F 21/44 | (2013.01) |

(52) U.S. Cl.
CPC ...... *G06F 9/45533* (2013.01); *G06F 9/45558* (2013.01); *G06F 21/30* (2013.01); *G06F 21/44* (2013.01); *H04L 29/06952* (2013.01); *H04L 63/0876* (2013.01); *H04L 63/0892* (2013.01); *H04L 63/10* (2013.01); *H04L 63/101* (2013.01); *H04L 63/162* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 2012/0151209 A1* | 6/2012 | Visnyak | ................ | H04L 9/3234 |
| | | | | 713/166 |
| 2013/0304917 A1* | 11/2013 | Mittal | .................. | H04L 63/101 |
| | | | | 709/225 |

* cited by examiner

*Primary Examiner* — Qing Yuan Wu

(57) ABSTRACT

A computer system authenticates a logical port for a virtual machine. A logical network maintains logical network data for a logical switch having the logical port. A virtual switch identifies a logical port authentication request for the virtual machine and transfers the logical port authentication request. A logical port authenticator receives the logical port authentication request and transfers the logical port authentication request for delivery to an authentication database. The logical port authenticator receives a logical port authentication response transferred by the authentication database that grants the logical port authentication request for the virtual machine and transfers authorization data for the logical port. The virtual switch transfers user data for the virtual machine when the virtual machine uses the logical port responsive to the authorization data.

20 Claims, 9 Drawing Sheets

LOGICAL PORT AUTHENTICATION FOR VIRTUAL MACHINES

TECHNICAL BACKGROUND

Computer hardware executes operating system software and user application software. The computer hardware includes components like Central Processing Units (CPUs), Random Access Memory (RAM), Network Interface Cards (NICs), and data storage drives. The CPUs execute the operating system software to control the computer hardware. The CPUs execute the user application software to interact with the operating system software. The operating system software controls the computer hardware on behalf of the user application software.

Virtualization software was introduced to free the interface between the computer hardware and the user application software. The virtualization software interacts with the operating system software that supports the user applications—referred to as the guest operating system and the guest applications. The virtualization software also interacts with a variety of computer hardware including the CPUs, RAM, NICs, and storage drives. The virtualization software comprises hypervisors and virtual machines. The virtual machine software features virtual CPUs, virtual RAM, virtual NICs, and virtual storage drives. The guest operating systems interact with the virtual machines instead of the physical computer hardware. For example, a guest operating system calls a virtual NIC for a data communication service.

The hypervisors implement virtual switches to network the virtual machines. The virtual switches exchange data between the various virtual machines operating on a single host. The virtual switches also exchange data between the virtual machines and the physical NICs to connect those virtual machines other virtual machines on other hosts and other systems generally. To assist network users, the hypervisors may allow the deployment of logical network overlays in their control plane to serve the virtual machines. For example, a guest user application calls its guest OS to exchange application data. The guest OS commands virtual NIC to exchange the application data, and the virtual NIC exchanges data with a virtual switch instantiated by the hypervisor. Based on the logical network overlay, the hypervisor may translate the logical destination address of egress traffic from the virtual machine to a physical host destination address and encapsulate the egress traffic with new network packet headers addressed to a host of the destination virtual machine. Likewise, the hypervisor may decapsulate packets destined for the local virtual machine to maintain the illusion that the virtual machine resides on the logical network.

A logical network manager distributes the logical networking overlays across multiple hypervisors in the hypervisor control plane. The hypervisors use the logical networking overlays to translate logical network traffic from the virtual NICs into encapsulated physical network traffic via the virtual switches and associated tunnel endpoints that perform the encapsulation and decapsulation operations. Unfortunately, the logical networks and the virtual networks do not efficiently and effectively control access between the virtual machines and the virtual switches when the virtual machines use logical ports in the logical network overlays.

The open-access that virtual switches provide to virtual machines that use logical ports fosters poor quality-of-service. Some virtual machines may overuse a logical port and its virtual switch at the expense of other virtual machines. Techniques to control access to data networks have been developed. For example, the Institute of Electrical and Electronics Engineers (IEEE) standard 802.1x specifies an Extensible Authentication Protocol (EAP). EAP is commonly used to control computer access to Local Area Networks (LANs). EAP has not been optimized for virtual switches that serve logical network overlays.

TECHNICAL OVERVIEW

A computer system authenticates a logical port for a virtual machine. A logical network maintains logical network data for a logical switch having the logical port. A virtual switch identifies a logical port authentication request for the virtual machine and transfers the logical port authentication request. A logical port authenticator receives the logical port authentication request and transfers the logical port authentication request for delivery to an authentication database. The logical port authenticator receives a logical port authentication response transferred by the authentication database that grants the logical port authentication request for the virtual machine and transfers authorization data for the logical port. The virtual switch transfers user data for the virtual machine when the virtual machine uses the logical port responsive to the authorization data.

DETAILED DESCRIPTION

Figure 1:
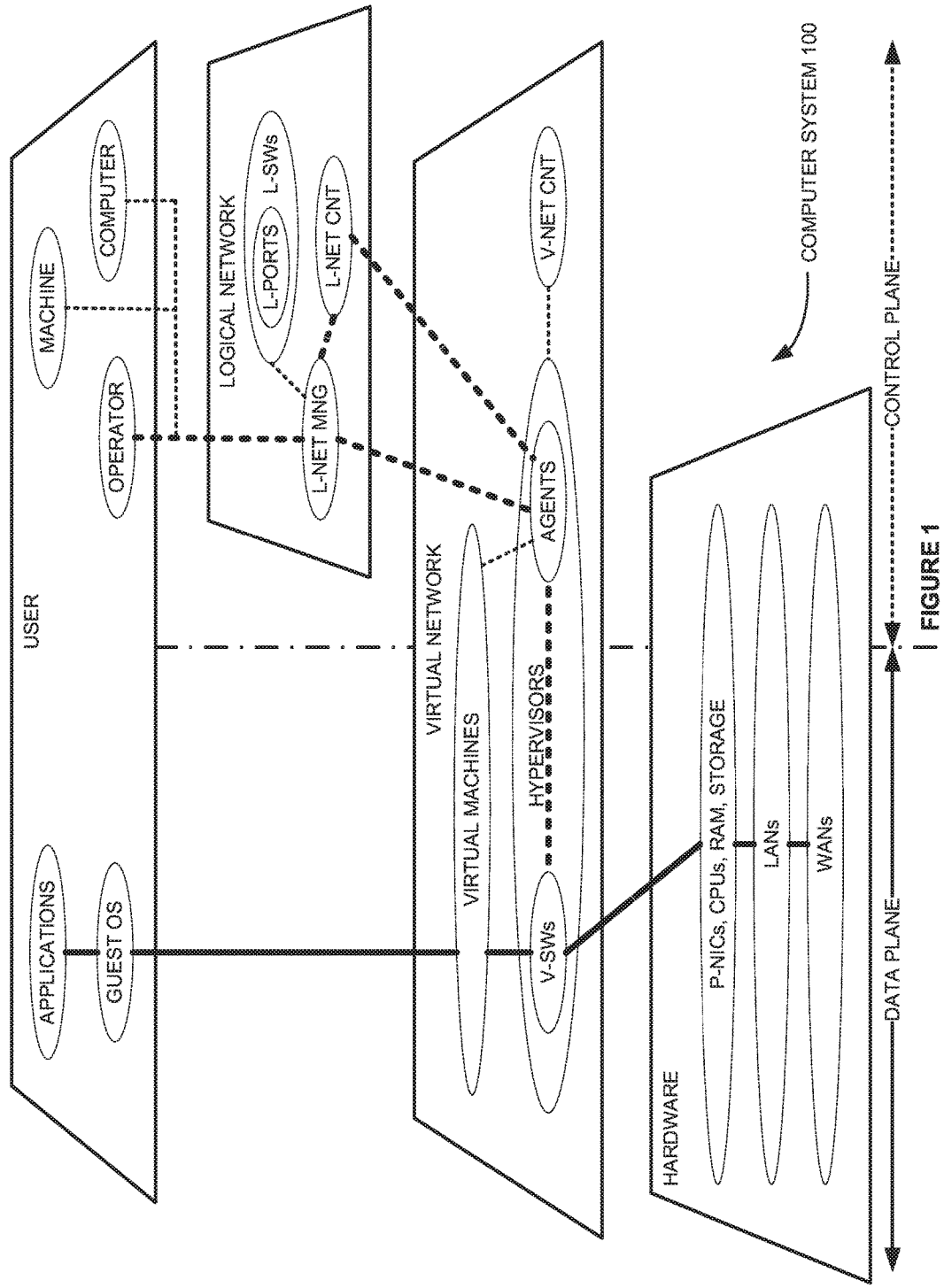
FIG. 1 illustrates a computer system to authenticate logical ports for virtual machines.

FIG. 1 illustrates a computer system 100 to authenticate logical ports for virtual machines. Computer system 100 comprises multiple host computers that are configured with software and that are coupled over a data communication network. On FIG. 1, computer system 100 is vertically separated into four layers for the user, logical network, virtual network, and hardware. Computer system 100 is also horizontally separated into a data plane on the left and a control plane on the right.

In the data plane, the hardware comprises Physical Network Interfaces (P-NICs), Central Processing Units (CPUs), Random Access Memory (RAM), storage devices, Local Area Networks (LANs), and Wide Area Networks (WANs). In the data plane, the virtual network includes hypervisors, virtual switches (V-SWs), and virtual machines. The user layer in the data plane includes guest operating systems (OS) and user applications.

In the control plane, the hardware also comprises the same or different P-NICs, CPUs, RAM, storage devices, LANs, and WANs. The virtual network in the control plane includes the hypervisors and virtual machines in addition to a virtual network (V-NET) controller. The logical network resides in the control plane and comprises a logical network manager (L-NET MNG) and a logical network controller (L-NET CNT). The logical network manager supports logical network constructs like logical switches (L-SWs) that have logical ports (L-PORTS). The control plane for the user layer includes operators, computers, and the like.

In operation, the user control plane (operator, machine, computer) directs the logical network manager to build a logical network having a logical switch, which has a logical port. For example, a user may operate a graphic display to instantiate a logical switch and then connect a virtual machine to a logical port on the logical switch. The logical network manager distributes logical network data to the hypervisors to form distributed logical switches in the hypervisor control plane. The hypervisors direct the virtual switches in the data plane to transfer user data responsive to logical network requirements specified by the control plane.

If the user enables logical port authentication on a logical switch, then the logical network manager directs the hypervisors to close the virtual switch data paths that support the logical ports on the logical switch. These virtual switches will not pass user data for a virtual machine that uses one of these logical ports unless logical port authentication is first successful for the virtual machine and the logical port.

The virtual switches scan the user data from the virtual machines for logical port authentication requests. If a virtual switch detects a logical port authentication request, then the virtual switch transfers the request to a hypervisor. The hypervisor transfers the logical port authentication request for authentication by a logical port authentication database. Various options are described below to perform this authentication. The hypervisor may transfer the logical port authentication request directly to a logical port authentication database (not shown). The hypervisor may transfer the logical port authentication request to the logical network controller which accesses the logical port authentication database. The hypervisor may also transfer the logical port authentication request to the logical network manager which operates as the logical port authentication database. The logical port authentication database determines logical port authentication status and transfers a logical port authentication response indicating a positive/negative authentication result and perhaps timers or policies to implement.

The hypervisor receives the logical port authentication response from the logical port authentication database, logical network controller, or logical network manager. The hypervisor directs the virtual switch to transfer user data for a virtual machine that uses its authenticated logical port. The virtual switch would still block user data transfers for un-authenticated virtual machines that use the logical port. In the data plane, the guest application and operating system exchange user data with the virtual machine, and the virtual machine exchanges the user data with the virtual switch. Response to positive logical port authentication, the virtual switch now exchanges the user data with another virtual machine or with a P-NIC.

Advantageously, computer system 100 authenticates logical ports for virtual machines. The logical port authentication prevents the virtual machines from over-using logical ports or from using the wrong logical port. The logical port authentication also prevents the virtual machines form over-using virtual switches or using the wrong virtual switch. Thus, the user may implement logical port authentication to preserve service quality through their virtual switches.

Figure 2:
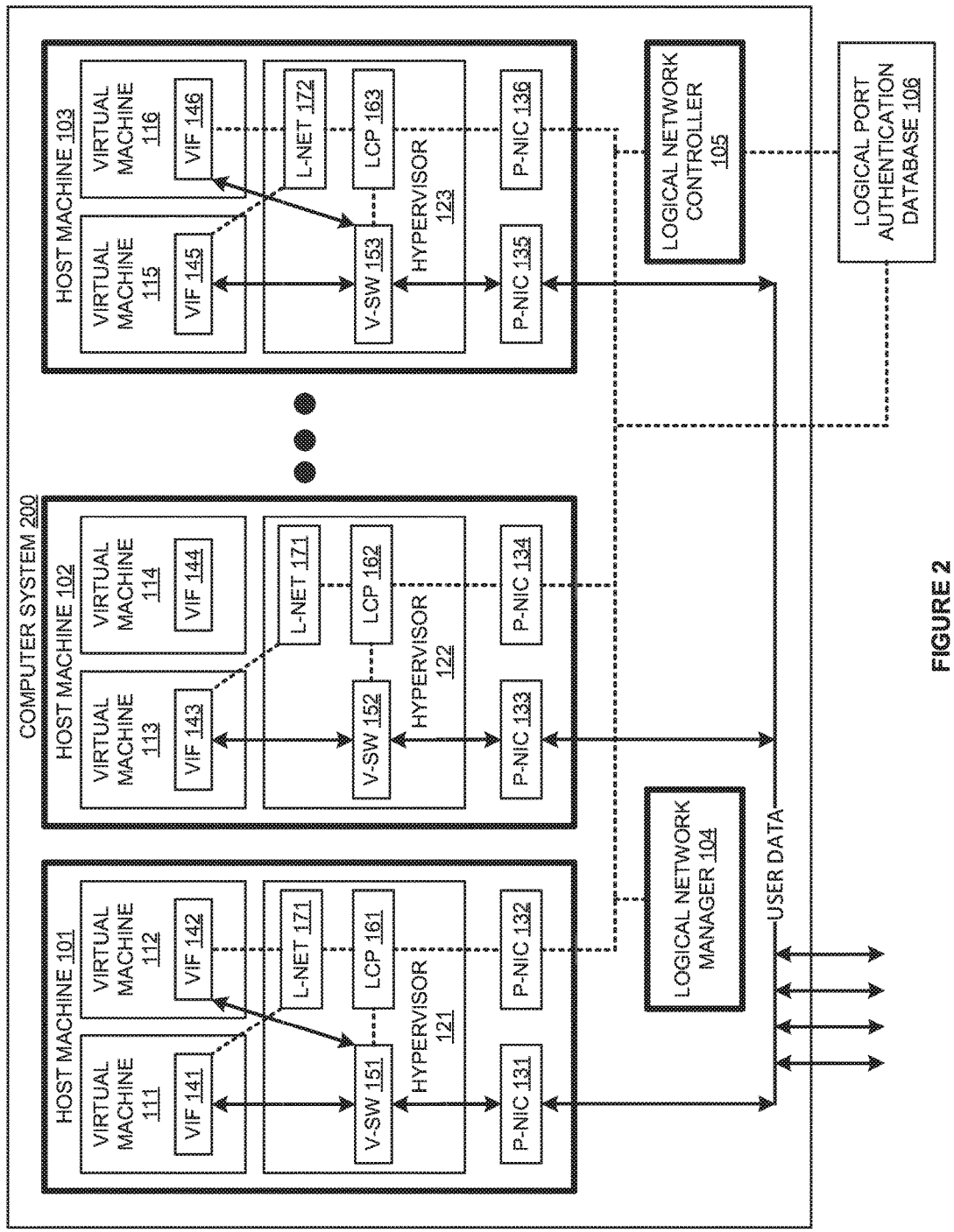
FIG. 2 illustrates a computer system to authenticate logical ports for virtual machines.

FIG. 2 illustrates a computer system 200 to authenticate logical ports for virtual machines. Computer system 200 includes hardware like CPUs, NICs, RAM, data links, and storage units. Computer system 200 comprises host machines 101-103, logical network manager 104, and logical network controller 105. Host machine 101 comprises virtual machines 111-112, hypervisor 121, and Physical NICs (P-NICs) 131-132. Virtual machines 111-112 comprise respective Virtual Interfaces (VIFs) 141-142.

VIFs 141-142 could be virtual NICs or other network data path components. Virtual machines 11, 112 also include, to support execution of guest system and application software, other virtualized hardware resources, such as virtual CPUs, virtual RAM, virtual storage, and the like (not shown). In one embodiment, hypervisor 121 comprises Virtual Switch (V-SW) 151, Local Control Plane (LCP) 161, and logical network (L-NET) 171. Hypervisor 121 may include drivers to interact with computer hardware and a kernel to execute virtual and logical network elements. In alternate embodiments (not shown), virtual switch 151 and various software drivers may reside in a privileged virtual machine (sometimes referred to as "domain zero," "root partition" or "parent partition") rather than in kernel space in each host. LCP 161 is a hypervisor process for communicating with central controller 105 and performing other control-plane functions.

Host machine 102 comprises virtual machines 113-114, hypervisor 122, and P-NICs 133-134. Virtual machines 113-114 comprise respective VIFs 143-144. Hypervisor 122 comprises virtual switch (V-SW) 152, LCP 162, and logical network 171. Note that logical network 171 is distributed across host machines 101-102 and perhaps other host machines under the control of logical network manager 104. Host machine 103 comprises virtual machines 115-116, hypervisor 123, and P-NICs 135-136. Virtual machines 115-116 comprise respective VIFs 145-146. Hypervisor 123 comprises V-SW 153, LCP 163, and logical network 172. A multitude of additional host machines, virtual machines, virtual switches, and logical networks could be included. For example, each host may include multiple virtual switches and/or logical switches.

Logical network manager 104 comprises a centralized manager for logical networks 171-172. Logical network manager 104 and logical network controller 105 may be combined into a single centralized manager/controller, or each controller and manager may be implemented a cluster of a computer systems to provide increased scale. In one embodiment, logical network manager 104 receives a logical network definition from a user or other system, the definition comprising logical network elements such as switches and routers, etc., and the identity of virtual machines or other compute endpoints connected to them. Additional logical network elements like distributed firewall, load balancers, etc. may likewise be defined. Logical network controller 105 translates these definitions to forwarding instructions and/or configurations that are appropriately forwarded to hosts 101-103 to implement the logical network components. Logical networks 171-172 represent forwarding instructions, tunnel endpoints, and/or other components residing at each host 101-103 to implement the communication network elements like logical switches. Each VM 111-116 has at least one virtual interface (VIF)

141-146 that is in communication with corresponding virtual switch 151-153. Logical networks 171-172 transform network traffic from the logical plane on which the VM is subjectively connected to the physical plane on which the hypervisor resides by, for example, encapsulating egress packets and decapsulating ingress packets using a tunneling protocol such as VXLAN. For example, a user may attach VIF 141 to a logical port on logical network 171 to establish a data path through V-SW 151. In a manner of speaking, logical networks 171-172 reside in the control plane of hypervisors 121-123 and exert control over user data flows, and rely on the physical network underlay to transfer user data. To serve logical network configurations across different host machines, logical network controller 105, via logical network 171, may instantiate data tunnels between hosts 101 and 102.

As mentioned, a user may interact with logical network manager 104, e.g., via a graphical user interface, to build logical networks 171-172. Logical networks 171-172 have logical switches with logical ports, and the users may require logical port authentication for these logical switches and ports. The users interact with logical network manager 104 to attach VIFs 141-146 to logical ports in logical networks 171-172. These VIF/logical network attachments are indicated on the figure by dotted lines.

VIFs 141-143 are attached to logical network 171 in hypervisors 121-122. VIFs 141-143 may be attached to the same logical switch and logical port, to the same logical switch and different logical ports, or to different logical switches and logical ports. In turn, the logical switches may be interconnected to logical routers and other elements to form a complete layer 2-7 logical network construct. LCPs 161-162 configure V-SWs 151-152 to transfer user data between VIFs 141-143 to serve the needs of logical network 171.

Since logical network 171 has port authentication enabled, LCPs 161-162 initially close (or never open) the data paths through V-SWs 151-152 that support the logical ports in network 171. For example, LCP 161 may close a data path for a particular VIF by setting configuring a network filter element such as an access control list (ACL) or firewall at VIF 141 or elsewhere along the datapath to drop packets that do not comply with a port authentication protocol and that originate at or terminate at VIF 141. LCPs 161-162 will open the data paths through V-SWs 151-152 when logical port authentication is successful. This can be done by removing the aforementioned filter configuration. These resulting user data transfers over the data paths are indicated on the figure by solid lines with arrows. V-SWs 151-153 may transfer user data between VIFs in the same host machine or between VIFs in different host machines over P-NICs 131, 133, and 135. V-SWs 151-153 may also transfer user data between VIFs 141-146 and external systems over P-NICs 131, 133, and 135.

Logical port authentication database 106 may comprise an external computer system that hosts data structures with logical port authentication information. Alternatively, logical port authentication database or data structures may reside at controller 105 or distributed among hosts 101-103. The data structures correlate logical ports with their data communication privileges and policies. The privileges indicate the allowed VIF/V-SW/logical port combinations and may include timers, counters, and the like to control usage. The policies indicate tasks like traffic shaping rules for individual VIFs or user applications. In some examples, logical network manager 104 may load authentication data into logical port authentication database 106 responsive to user control.

Logical port authentication database 106 may use the Extensible Authentication Protocol (EAP) described by Institute of Electrical and Electronics Engineers (IEEE) standard 802.1x. Logical port authentication database 106 may also use the Remote Authentication Dial-In Service (RADIUS) protocol for data communications. Although RADIUS is mentioned here, other authentication protocols may be contemplated.

In operation, users direct logical network manager 104 to build logical network 171. For example, the user may operate a graphic display to instantiate a logical switch and then connect VIFs 141-143 to a logical port on the logical switch. Logical network 171 maintains logical network data for the logical switch and logical port.

Responsive to the logical port authentication requirement, V-SWs 151-152 scan user data to identify logical port authentication requests from VIFs 141-144. V-SWs 151-152 transfer any logical port authentication requests to LCPs 161-162 in a processing transition from kernel-space to user-space. LCPs 161-162 transfer the logical port authentication requests to a logical port authenticator (not shown). As detailed below, the logical port authenticator may reside in hypervisors 121-122, in logical network controller 105, or in a separate server or virtual appliance (not shown).

The logical port authenticator receives the logical port authentication request and transfers the logical port authentication request for delivery to logical port authentication database 106. The logical port authentication requests indicate the individual VIF/logical port/V-SW combinations to be authenticated. The logical port authentication requests may also indicate data like V-NIC Media Access Control (MAC) addresses, user applications, and the like.

For a given logical port authentication request, logical port authentication database 106 enters its data structures with the VIF/logical port/V-SW data to determine authentication status. If the data structures yield a positive result, then logical port authentication database 106 transfers a logical port authentication response indicating the authenticated VIF/logical port/V-SW combination and perhaps timers, counters, and policies to implement. If the data structures yield a negative result, then logical port authentication database 106 transfers a logical port authentication response indicating the failure to authenticate the specific VIF/logical port/V-SW combination.

The logical port authenticator (in controller 105 or hypervisors 121-123) receives the logical port authentication responses transferred by logical port authentication database 106. The logical port authenticator transfers the logical port authentication responses to LCPs 161-162. LCPs 161-162 configure V-SWs 151-152 to serve VIFs 141-143 when the VIFs use their authenticated logical ports. V-SWs 151-152 transfer user data for VIFs 141-143 when the VIFs use their authenticated logical ports. V-SWs 151-152 may transfer user data between VIFs in the same host machine or between VIFs in different host machines over P-NICs 131 and 133. V-SWs 151-152 may also transfer user data between external systems and VIFs 141-143 over P-NICs 131 and 133.

In a typical scenario, logical port authentication may be active on logical network 171 but not active on logical network 172. V-SW 152 identifies a logical port authentication request from VIF 143 for logical port A in logical network 171. V-SW 152 transfers the logical port authentication request to LCP 162, and LCP 162 transfers the logical port authentication request to the logical port authenticator. The logical port authenticator transfers the logical port authentication request to logical port authentication database 106, wherein the response from the database may be used by the logical port authenticator to determine whether to grant or deny the request. In some implementations, logical port authentication database 106 may provide a logical port authentication response indicating the authenticated combination (VIF 143, logical port A, V-SW 152) and a time-to-live for the authentication.

The logical port authenticator receives the logical port authentication response and transfers the response to LCP 162. LCP 162 configures V-SW 152 to serve VIF 143 when VIF 143 uses the authenticated logical port. V-SW 152 transfers user data for VIF 143 when it uses its authenticated logical port. LCP 161-162 and/or controller 105 enforce the time-to-live by re-configuring V-SW 151-152 to close the logical port upon time-to-live expiry.

V-SW 152 may identify an improper logical port authentication request from VIF 144 for logical port A in logical network 171. V-SW 152 transfers the logical port authentication request to LCP 162, and LCP 162 transfers the logical port authentication request to the logical port authenticator. The logical port authenticator transfers the logical port authentication request to logical port authentication database 106. Logical port authentication database 106 does not grant the request and transfers a logical port authentication response indicating the failed authentication for VIF 144, logical port A, and V-SW 152. The logical port authenticator receives the logical port authentication response and transfers the response to LCP 162. LCP 162 informs logical network 171 and VIF 144 of the failure. V-SW 152 does not serve VIF 144 when VIF 143 uses the logical port A. Thus, V-SW 152 is shielded from over-use by VIF 144.

Since logical port authentication is not active on logical network 172, V-SW 153 is not configured to identify logical port authentication requests from VIFs 145-146. V-SW 153 transfers user data for VIFs 145-146 without performing logical port authentication. VIF 146 may overuse a logical port and V-SW 153 at the expense of VIF 145.

Advantageously, computer system 200 authenticates logical ports for virtual 111-113 machines and their VIFs 141-143. The logical port authentication prevents virtual machines 114-116 from over-using or incorrectly using the logical port. The logical port authentication also prevents virtual machines 114-116 form over-using or incorrectly using the wrong virtual switch. Thus, the user may implement logical port authentication to preserve service quality for their virtual machines through their virtual switches.

Three different examples are detailed below. The first example uses the logical network controller to handle logical port authentication between the virtual switch and the logical port authentication database. The second example uses the hypervisor to handle logical port authentication between the virtual switch and the logical port authentication database. The third example uses the logical network manager perform logical port authentication operating as the logical port authentication database.

Logical Port Authentication Over a Logical Network Controller

Figure 3:
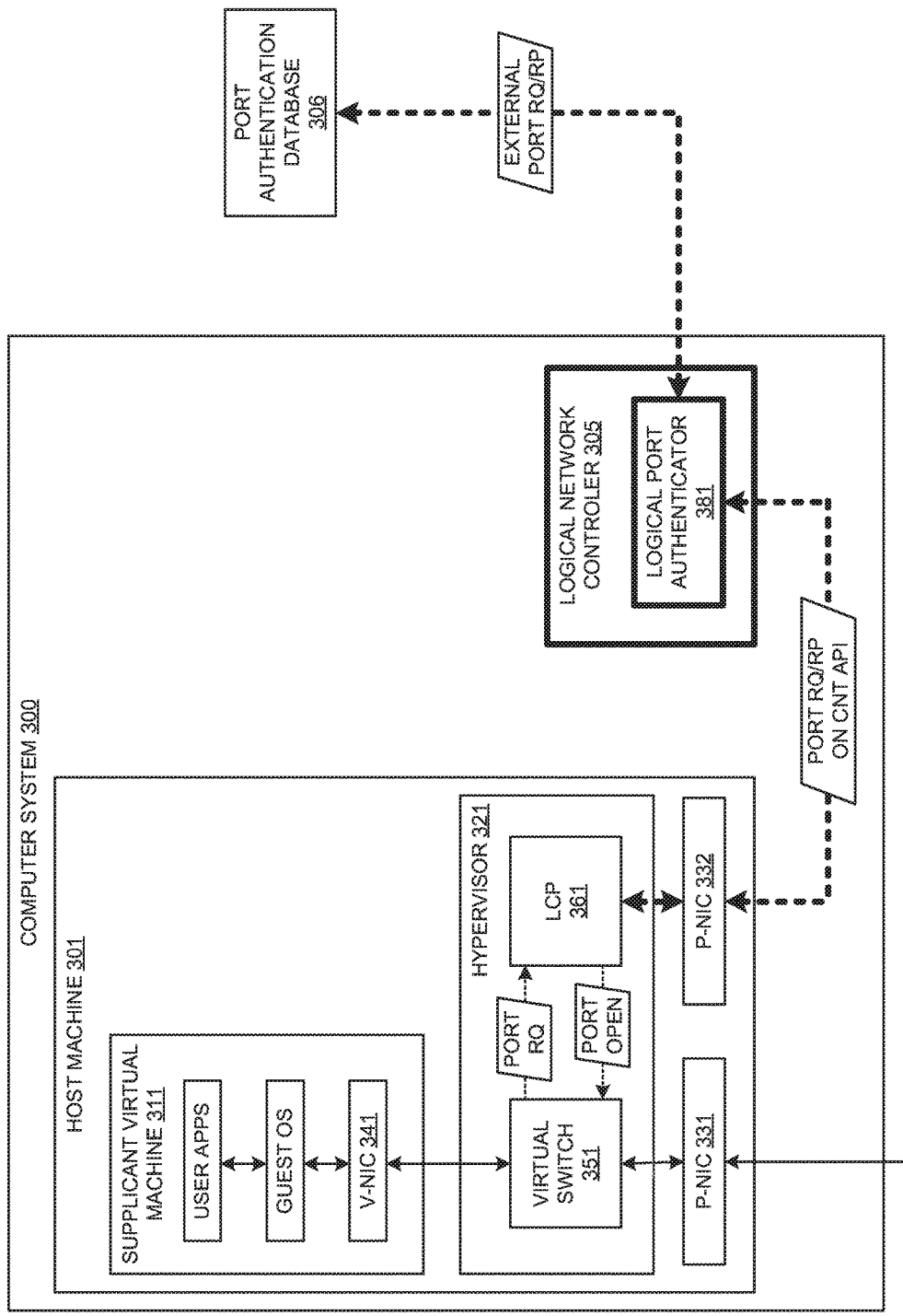
FIG. 3 illustrates a computer system that uses a logical network controller to authenticate logical ports for virtual machines.

FIG. 3 illustrates computer system 300 that performs logical port authentication over logical network controller 305. Computer system 300 is an example of computer system 200, although system 100 may use alternative configurations and operations. Computer system 300 comprises host machine 301 and logical network controller 305. Host machine 301 comprises supplicant virtual machine 311, hypervisor 321, and P-NICs 331-332. Virtual machine 311 comprises Virtual NIC (V-NIC) 341, a guest operating system (OS), and user applications (APPS). Hypervisor 321 comprises Virtual Switch 351 and Local Control Plane (LCP) 361. LCP 361 and logical network controller 305 are coupled over a logical network controller Application Programming Interface (API). For clarity, the logical network in hypervisor 321 is omitted from the figure, but the logical network includes data constructs for logical switches and ports.

V-SW 351 identifies a logical port authentication request from V-NIC 341. V-SW 351 forwards the logical port authentication request to LCP 361. LCP 361 changes state for the logical port from closed to authenticating. LCP 361 transfers the logical port authentication request to logical port authenticator 381 in logical network controller 305 over the logical network controller API. Logical port authenticator 381 receives the logical port authentication request and transfers the logical port authentication request logical port authentication database 306. Logical port authenticator 381 maintains state for the logical port and changes its state from closed to authenticating. The logical port authentication requests indicate the individual V-NIC/logical port/V-SW combination to be authenticated. The logical port authentication request also indicates the MAC address for V-NIC 341.

Logical port authentication database 306 enters its data structures with the VIF/logical port/V-SW data to determine authentication status. If the data structures yield a positive grant, then logical port authentication database 306 transfers a logical port authentication response indicating the authenticated V-NIC/logical port/V-SW combination and perhaps timers, counters, and policies to implement. If the data structures yield a negative result, then logical port authentication database 306 transfers a logical port authentication response indicating the failure to authenticate the specific V-NIC/logical port/V-SW combination.

Logical port authenticator 381 in logical network controller 305 receives the logical port authentication response from logical port authentication database 306. Logical port authenticator 381 transfers the logical port authentication response to LCP 361 over the logical network controller API. Logical port authenticator 381 maintains state for the logical ports and stores authentication context data.

LCP 361 receives the logical port authentication response. LCP 361 configures V-SW 351 to transfer user data for V-NIC 341 if V-NIC 341 uses the authenticated logical port. V-SW 351 transfers user data for V-NIC 341 when V-NIC 341 uses an authenticated logical port. V-SW 351 blocks user data transfers if V-NIC 341 does not use an authenticated logical port. V-SW 351 continues to block user data transfers from unauthenticated V-NICs.

Figure 4:
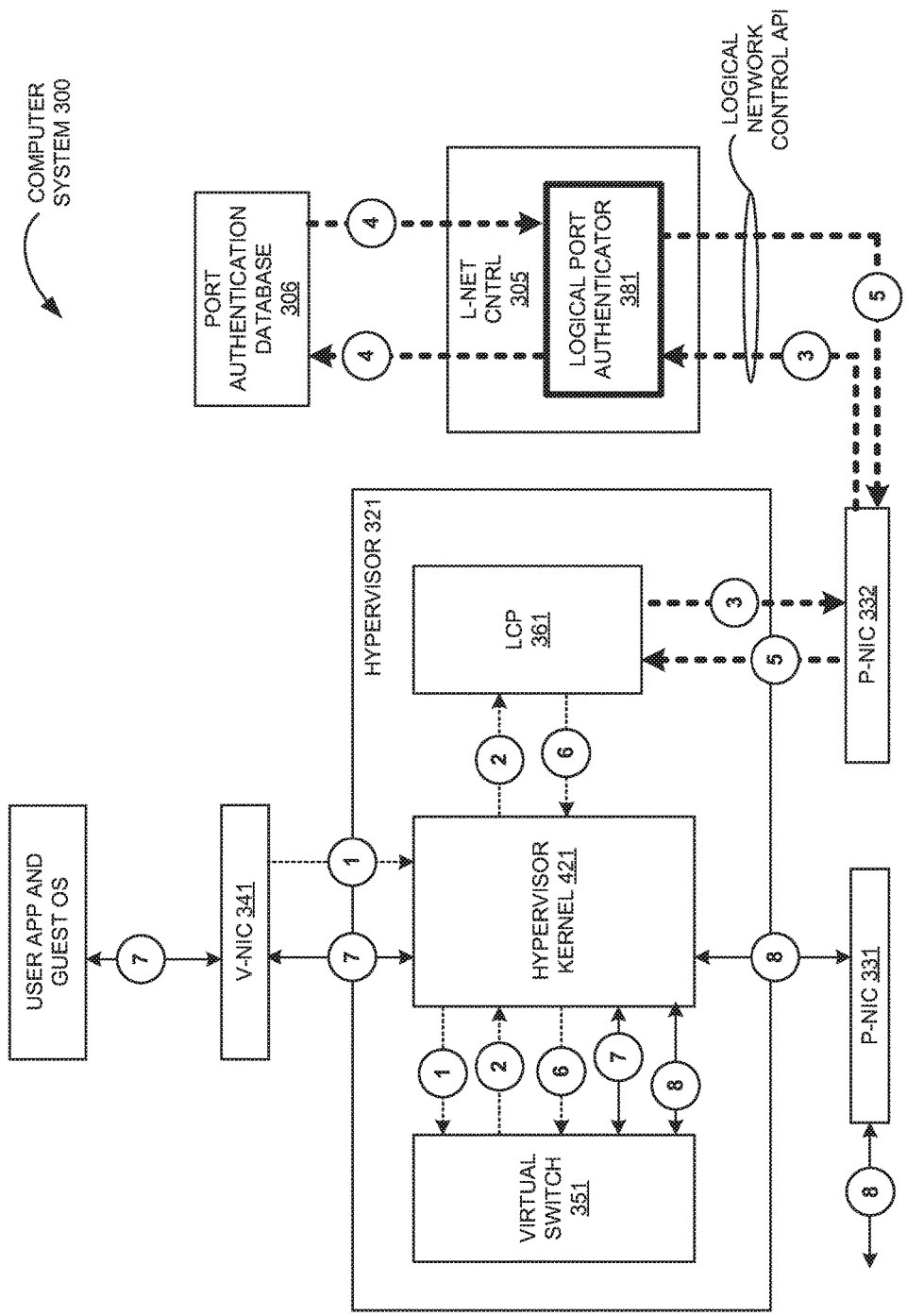
FIG. 4 illustrates the operation of the computer system that uses the logical network controller to authenticate logical ports for virtual machines.

FIG. 4 illustrates the operation of computer system 300 to perform logical port authentication using logical network controller 305. In a first operation, V-NIC 341 transfers an EAP logical port authentication request to its logical switch port. Hypervisor kernel 421 receives the EAP logical port authentication request. Hypervisor kernel 421 transfers the EAP logical port authentication request to virtual switch 351. In an alternate embodiment, the request may be passed to virtual switch 351 without interaction by hypervisor kernel 421. For example, a data bus established between the virtual machine (not indicated in FIG. 4) and the virtual switch, which may reside outside hypervisor kernel 421, e.g., in a privileged VM, may pass the request directly to virtual switch 351.

In a second operation, V-SW 351 detects the EAP logical port authentication request. V-SW 351 forwards the EAP logical port authentication request to hypervisor kernel 421.

The EAP logical port authentication request indicates V-NIC 342, V-NIC MAC, V-SW 351, and logical port to be authenticated. Hypervisor kernel 421 transfers the EAP logical port authentication request to LCP 361. LCP 361 is responsible for changing the state for the logical port from closed to authenticated. Although shown separately, LCP 361 may be integrated with hypervisor kernel 421. In an alternate embodiment, virtual switch 351 passes the logical port authentication request directly to LCP 361 without involving hypervisor kernel 421.

In a third operation, LCP 361 transfers the EAP logical port authentication request to logical port authenticator 381 in logical network controller 305. In one embodiment, LCP 361 communicates with logical port authenticator 381 via a logical network controller API. In a fourth operation, logical port authenticator 381 transfers a RADIUS message having the EAP logical port authentication request to logical port authentication database 306. Logical port authentication database 306 processes the EAP logical port authentication request to determine authentication status for the V-NIC/V-SW/logical port combination. If its data structures bases yield a positive grant, then logical port authentication database 306 transfers a RADIUS message having an EAP logical port authentication response. The EAP logical port authentication response indicates the authenticated V-NIC/logical port/V-SW combination and perhaps timers, counters, and policies to implement. If the data structures yield a negative result, then logical port authentication database 306 transfers a logical port authentication response indicating the failure to authenticate the specific V-NIC/logical port/V-SW combination. Logical port authenticator 381 in logical network controller 305 receives the logical port authentication response from logical port authentication database 306.

In a fifth operation, logical port authenticator 381 transfers the logical port authentication response to LCP 361 over the logical network controller API. Logical port authenticator 381 changes state for the logical port from authenticating to open or closed based on the response and stores any authentication data. In a sixth operation, LCP 361 configures V-SW 351 to transfer user data for V-NIC 341 when using the logical port responsive to a positive authentication. LCP 361 changes state for the logical port from authenticating to open or closed based on the response and stores any authentication data. Logical port authenticator 381 and LCP 361 track and enforce any time-to-lives or other limitations.

In a seventh operation, a user application transfers user data to V-NIC 341 over the guest OS. V-NIC 341 transfers the user data to hypervisor kernel 421. Hypervisor kernel 421 transfers the user data to V-SW 351. In an eighth operation, V-SW 351 transfers the user data from V-NIC 341 to PNIC 331 (or another V-NIC) when V-NIC 341 uses the authenticated logical port. V-SW 351 blocks the user data if V-NIC 341 does not use the authenticated logical port. V-SW 351 blocks user data for un-authenticated V-NICs trying to use the logical port.

Advantageously, computer system 300 performs logical port authentication for virtual machines and their VIFs. Computer system 300 uses the logical network control API to efficiently centralize logical port authenticator 381. Computer system 300 uses centralized logical port authenticator 381 to transfer logical port authentication context from one hypervisor to another as their virtual machines move about.

Logical Port Authentication Over the Hypervisor

Figure 5:
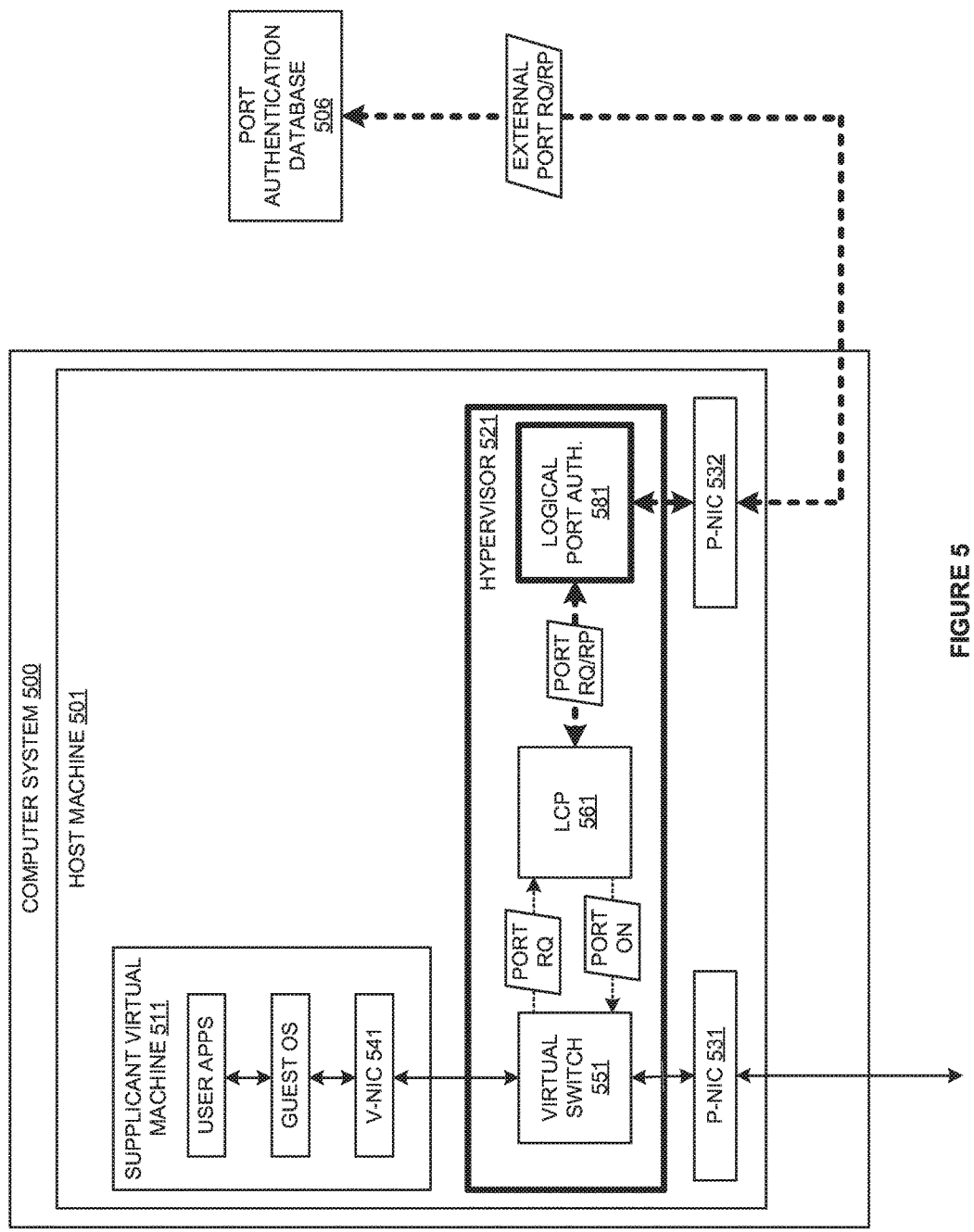
FIG. 5 illustrates a computer system that uses a hypervisor to authenticate logical ports for virtual machines.

FIG. 5 illustrates computer system 500 that performs logical port authentication over logical port authenticator 581 in hypervisor 521. Aside from participation by LCP 561, the logical network controller is not used for logical port authentication in this example. Computer system 500 is an example of computer system 200, although system 100 may use alternative configurations and operations. Computer system 500 comprises host machine 501. Host machine 501 comprises supplicant virtual machine 511, hypervisor 521, and P-NICs 531-532. Virtual machine 511 comprises V-NIC 541, a guest operating system, and user applications. Hypervisor 521 comprises Virtual Switch 551 and LCP 561. For clarity, the logical network in hypervisor 521 is omitted from the figure, but the logical network includes data constructs for logical switches and ports.

V-SW 551 identifies a logical port authentication request from V-NIC 541. V-SW 551 forwards the logical port authentication request to LCP 561. LCP 561 maintains state for the logical port. LCP 561 transfers the logical port authentication request to logical port authenticator 581. Logical port authenticator 581 receives the logical port authentication request and transfers the logical port authentication request to logical port authentication database 506. Logical port authenticator 581 receives access data for logical port authentication database 506 from its logical network control or management system. Logical port authenticator 581 also maintains state for the logical port. The logical port authentication requests indicate the individual V-NIC/logical port/V-SW combination to be authenticated. The logical port authentication request also indicates the MAC address for V-NIC 541.

Logical port authentication database 506 enters its data structures with the VIF/logical port/V-SW data to determine authentication status. If the data structures yield a positive grant, then logical port authentication database 506 transfers a logical port authentication response indicating the authenticated V-NIC/logical port/V-SW combination and perhaps timers, counters, and policies to implement. If the data structures yield a negative result, then logical port authentication database 506 transfers a logical port authentication response indicating the failure to authenticate the specific V-NIC/logical port/V-SW combination.

In hypervisor 521, logical port authenticator 581 receives the logical port authentication response from logical port authentication database 506. Logical port authenticator 581 transfers the logical port authentication response to LCP 561. Both logical port authenticator 581 and LCP 561 maintains state for the logical port. LCP 561 receives the logical port authentication response. LCP 561 configures V-SW 551 to transfer user data for V-NIC 541 if V-NIC 541 uses the authenticated logical port. V-SW 551 then transfers user data for V-NIC 541 when V-NIC 541 uses an authenticated logical port. V-SW 551 blocks user data transfers if V-NIC 541 does not use an authenticated logical port. V-SW 551 blocks un-authenticated V-NICs from using the logical port.

Figure 6:
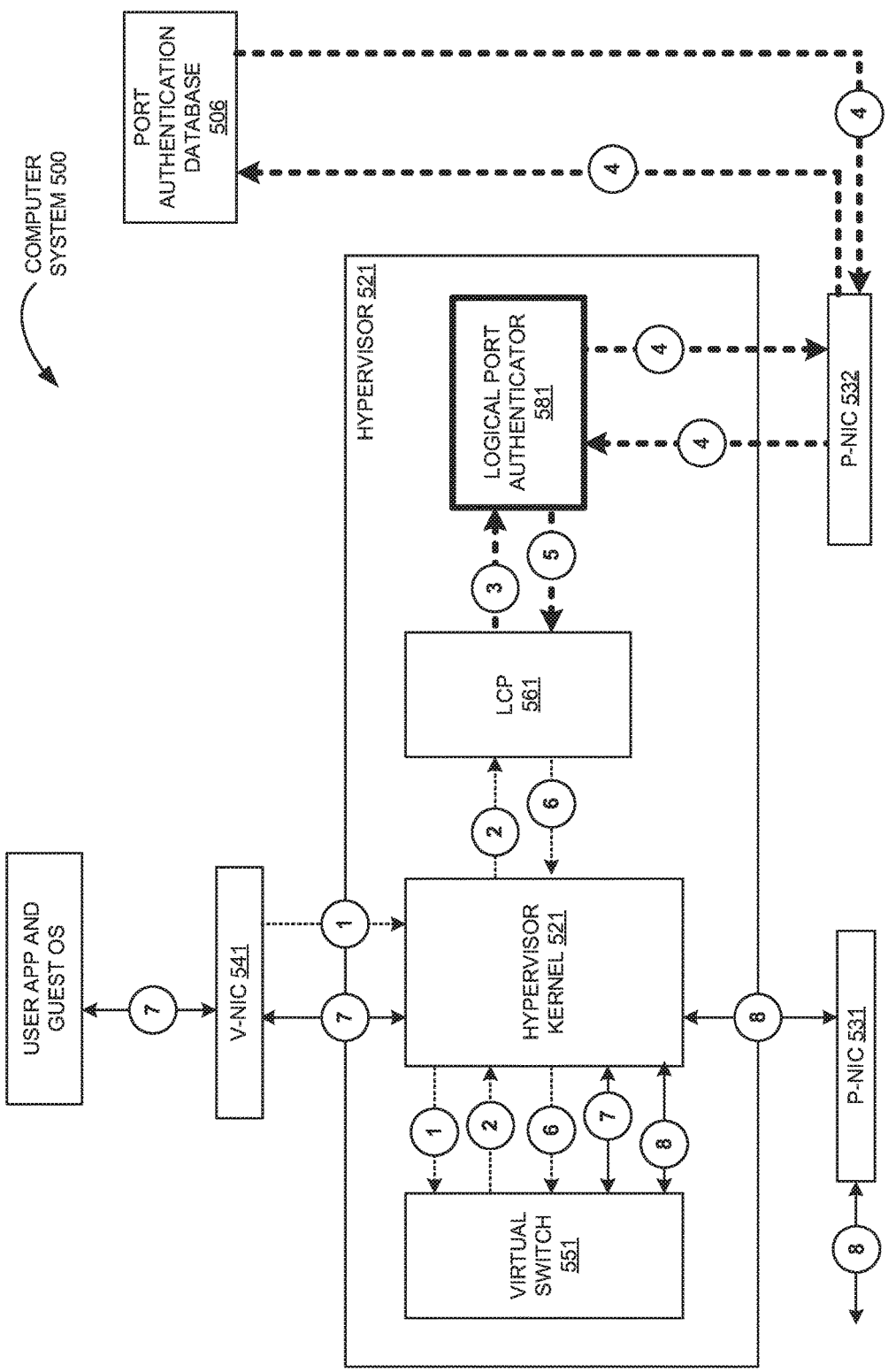
FIG. 6 illustrates the operation of the computer system that uses the hypervisor to authenticate logical ports for virtual machines.

FIG. 6 illustrates the operation of computer system 500 to perform logical port authentication using hypervisor 521. In a first operation, V-NIC 541 transfers an EAP logical port authentication request to V-SW 551.

In a second operation, V-SW 551 detects the EAP logical port authentication request. V-SW 551 forwards the EAP logical port authentication request to hypervisor kernel 521. The EAP logical port authentication request indicates V-NIC 541, V-NIC MAC, V-SW 551, and logical port to be authenticated. Hypervisor kernel 521 transfers the EAP logical port authentication request to LCP 561. LCP 561 changes state for the logical port from closed to authenticating. In a third operation, LCP 561 transfers the EAP logical port authentication request to logical port authenticator 581. Virtual switch 551 and logical control plane 561 may be integrated with hypervisor kernel 521, or they may reside outside kernel 521. In an alternative embodiment, LCP 561 and/or virtual switch 551 may reside in a privileged virtual machine (not shown) and the EAP logical port authentication request received by V-NIC 541 is passed to virtual switch 551 without involving hypervisor kernel 521, e.g., via a shared memory data bus established between VM 511 and the privileged virtual machine. In addition, virtual switch 551 may pass the EAP logical port authentication request to LCP without involving hypervisor kernel 521.

In a fourth operation, logical port authenticator 581 transfers a RADIUS (or other authentication) message to logical port authentication database 506 having the EAP logical port authentication request. Logical port authenticator 581, or other component such as LCP 561, changes state for the logical port from closed to authenticating. Logical port authentication database 506 processes the EAP logical port authentication request to determine authentication status for the V-NIC/V-SW/logical port combination. If its data structures yield a positive grant, then logical port authentication database 506 transfers a RADIUS message having an EAP logical port authentication response. The EAP logical port authentication response indicates the authenticated V-NIC/logical port/V-SW combination and perhaps timers, counters, and policies to implement. If the data structures yield a negative result, then logical port authentication database 506 transfers a logical port authentication response indicating the failure to authenticate the specific V-NIC/logical port/V-SW combination. Logical port authenticator 581 in hypervisor 521 receives the logical port authentication response from logical port authentication database 506.

In a fifth operation, logical port authenticator 581 transfers the logical port authentication response to LCP 561. Logical port authenticator 581 changes state for the logical port from authenticating to open or closed based on the response and stores any authentication data. In a sixth operation, LCP 561 configures V-SW 551 to transfer user data for V-NIC 541 when using the logical port responsive to a positive authentication. LCP 561 changes state for the logical port from authenticating to open or closed based on the response and stores any authentication data.

In a seventh operation, a user application transfers user data to V-NIC 541 over the guest OS. V-NIC 541 transfers the user data to hypervisor kernel 521. Hypervisor kernel 521 transfers the user data to V-SW 551. In an eighth operation, V-SW 551 transfers the user data from V-NIC 541 to PNIC 531 (or another V-NIC) when V-NIC 541 uses an authenticated logical port. V-SW 551 blocks the user data if V-NIC 541 does not use an authenticated logical port. V-SW 551 blocks un-authenticated V-NICs from using the logical port.

Note that a logical network manager can form a central management point for the logical port authenticators in the individual hypervisors. The logical network manager distributes authentication database access information to the logical port authenticators in the individual hypervisors. The logical network manager may also exchange virtual machine authentication context between the logical port authenticators in the hypervisors as the virtual machines move about.

Advantageously, computer system 500 performs logical port authentication for virtual machines and their VIFs. Computer system 500 uses the hypervisors to efficiently distribute logical port authenticator 581. This distribution virtualizes some of the authentication messaging within the hypervisor for optimal efficiency. The distribution also facilitates robust authentication in scenarios where the logical network controller or its control API is down or congested.

Logical Port Authentication Over the Logical Network Manager

Figure 7:
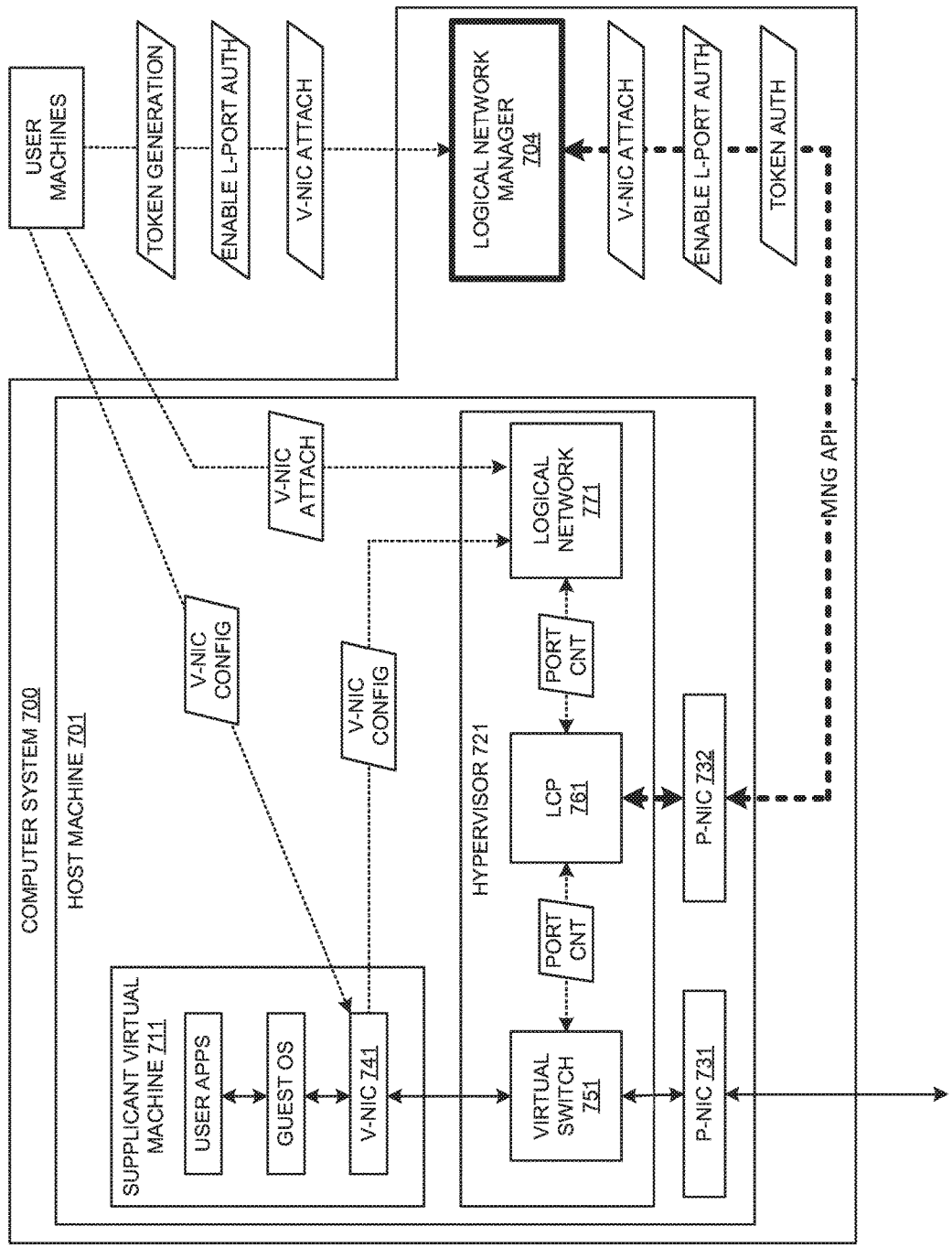
FIG. 7 illustrates a computer system that uses a logical network manager to authenticate logical ports for virtual machines.

FIG. 7 illustrates computer system 700 that performs logical port authentication over logical network manager 704. Computer system 700 is an example of computer system 200, although system 100 may use alternative configurations and operations. Computer system 700 comprises host machine 701 and logical network manager 704. Host machine 701 comprises supplicant virtual machine 711, hypervisor 721, and P-NICs 731-732. Virtual machine 711 comprises V-NIC 741, a guest operating system, and user applications. Hypervisor 721 comprises Virtual Switch 751, LCP 761, and logical network 771.

A user, or automated system such as an orchestrator, interacts with logical network manager 704 to build logical network on which a virtual machine 701 resides. Logical network 771 comprises forwarding table and other configuration information that resides in or in conjunction with virtual switch 751. Together with other forwarding table and configuration information on other hosts (not shown), logical network 771 collectively implements one or more logical switches. Each logical switch includes logical ports that are each mapped to virtual ports on virtual switches such as virtual switch 751. Virtual switch 751 is an edge switch of a physical network and is "virtual" only in the sense that it is implemented in software. From the perspective of VM 711, it communicates over a physical network that is in reality a logical overlay network, which is an abstraction implemented by the configuration and forwarding table information.

The user interacts with logical network manager 704 to generate logical port usage tokens for select V-NIC/V-SW/logical port combinations. The logical port usage tokens represent authentication context and policy data for a logical port. For a logical port, the token indicates logical network identifier (ID), logical switch ID, allowed VIF IDs and MAC addresses, token policies, time-to-live limits, data counts, traffic shaping policies, and other pertinent data.

The user then interacts with logical network manager 704 to attach V-NIC 741 to the logical port on the logical switch in logical network 771. In response to the V-NIC attachment and the logical port authentication requirement, logical network manager 704 automatically identifies a usage token for V-NIC 741, V-SW 751, and the logical port. Logical network manager 704 may also identify policies for the V-NIC/V-SW/logical port combination. Logical network manager 704 transfers the authenticated logical port usage token to LCP 761 over the logical network manager API. LCP 761 and logical network manager 704 maintain state for the logical port.

LCP 761 receives the logical port usage token authentication. LCP 761 configures V-SW 751 to transfer user data for V-NIC 741 if V-NIC 741 uses the authenticated logical port usage token. LCP 761 may configure V-SW 751 to consume usage credits and/or apply policies. Thus, LCP 761 serves as the port authenticator. LCP 761 and logical network manager 704 act together to serve as the logical port authentication database.

A user application transfers user data through the guest OS to V-NIC 751. V-NIC 751 transfers the user data to V-SW 751. V-SW 751 detects the use of an authenticated logical port usage token and transfers user data for V-NIC

741. V-SW 751 may notify LCP 761 about the data transfer to enable token consumption or policy application by LCP 761. V-NIC 741 blocks user data transfers that do not use authenticated logical port usage tokens.

The logical port usage tokens may also be used to implement user policies like traffic shaping. The tokens may specify the policies for an individual logical port when combined with an individual virtual machine, VIF, user application, logical network, or logical switch. For example, virtual switch 751 may limit the data throughput of V-NIC 741 during certain time of day to protect quality-of-service for other VIFs that share the logical port/virtual switch combination.

In the above example, logical network manager 704 automatically initiated logical port authentication upon V-NIC to logical port attachment instructions from the user. The user could be a person, computer, virtual machine, or the like. Alternatively, hypervisor 721 may automatically initiate logical port authentication upon V-NIC to logical port attachment instructions from the user. When responding to V-NIC attachment instructions, a hypervisor or logical network 771 can read a logical port authentication request from the V-NIC 741 configuration file. In response, the hypervisor or logical network 771 automatically initiates logical port authentication for V-NIC 741 through LCP 761 to logical network manager 704. Logical network manager 704 typically responds with an authenticated logical port usage token.

In some examples, the V-NIC configuration file may include a logical port usage token. When responding to the V-NIC attachment instructions, the hypervisor, virtual switch 751, or LCP 761 would read the logical port authentication token from the V-NIC 741 configuration file. In response, the hypervisor or logical network 771 would automatically initiate logical port authentication for V-NIC 741 and the included token through LCP 761 to logical network manager 704.

In yet another alternative, a virtual machine or its VIFs may initiate logical port authentication. For example, V-NIC 741 may identify a logical port authentication request and/or a logical port usage token in its configuration file during instantiation. V-NIC 741 then automatically initiates logical port authentication through logical network 771 and LCP 761. Upon successful authentication, V-NIC 741 transfers user data over virtual switch 751 by using its authenticated logical port usage token. Thus, V-NIC 741 may efficiently self-authenticate its logical port based on its configuration file and automatically use its logical port token to transfer user data.

Figure 8:
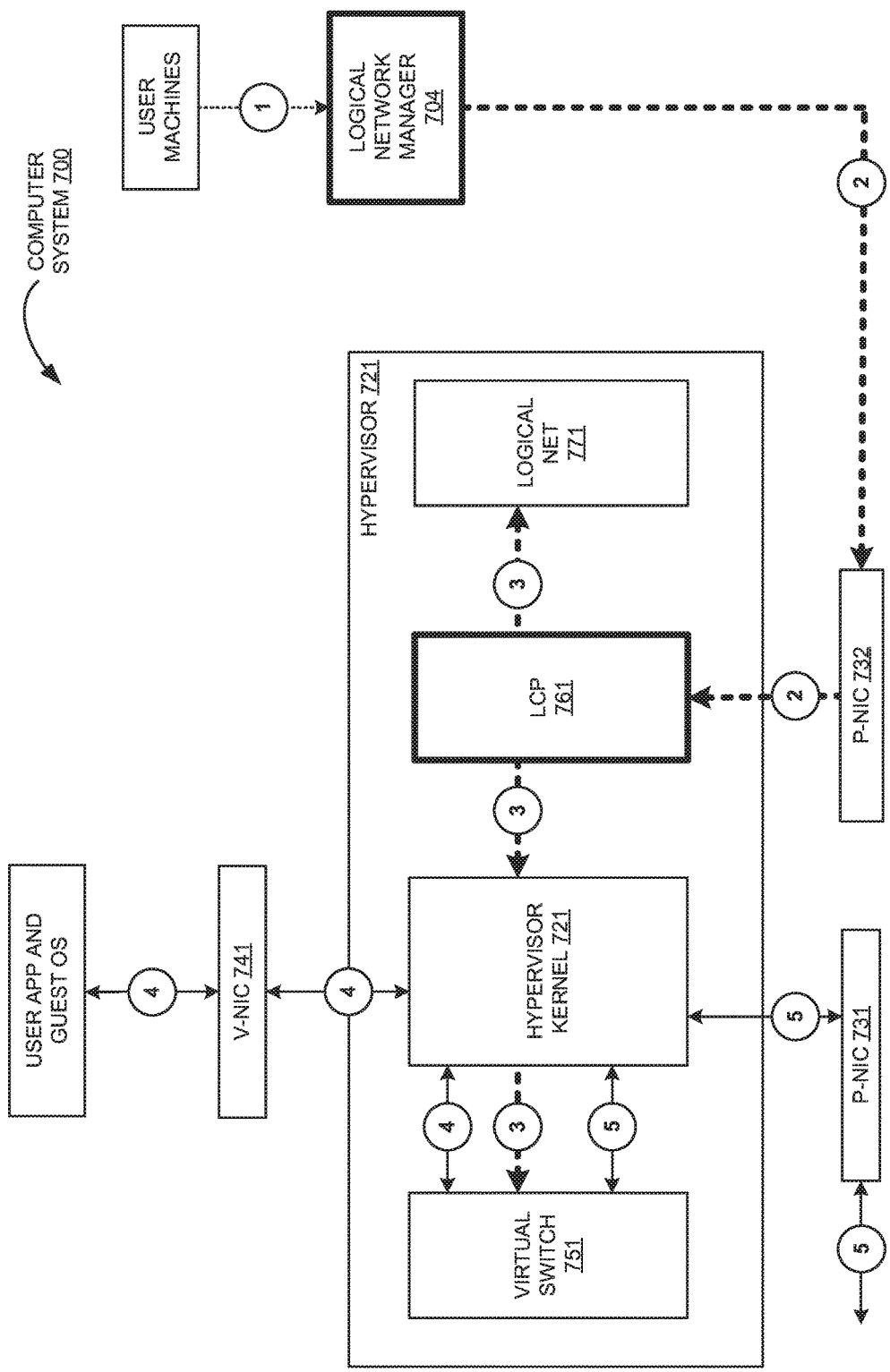
FIG. 8 illustrates the operation of the computer system that uses the logical network manager to authenticate logical ports for virtual machines.

FIG. 8 illustrates the operation of computer system to perform logical port authentication using logical network manager 704. In a first operation, a user interacts with logical network manager 704 to build logical network 771 on hypervisor 721. Logical network 771 includes a logical switch to serve V-NIC 741 over a logical port. The user interacts with logical network manager 704 to implement logical port authentication on the logical switch. The user interacts with logical network manager 704 to generate logical port usage tokens for V-NIC 741, V-SW 751, and logical port X. The logical port usage tokens represent authentication context and policy data for logical port X. For logical port X, the token might indicate logical network 771, the logical switch ID, V-NIC 741 and its MAC address, traffic shaping policy for V-NIC 741, and a time-to-live for V-NIC 741 token use. The user then interacts with logical network manager 704 to attach V-NIC 741 to logical port X on the logical switch in logical network 771.

In a second operation and responsive to the user's V-NIC attachment and logical port authentication requirement, logical network manager 704 automatically identifies an authentic usage token for V-NIC 741, V-SW 751, and logical port X that was generated by the user. Logical network manager 704 transfers the authenticated logical port usage token to LCP 761 over the logical network manager API. LCP 761 and logical network manager 704 maintain state for logical port X.

In a third operation, LCP 761 configures V-SW 751 to transfer user data for V-NIC 741 if V-NIC 741 uses the authenticated token for logical port X. LCP 761 may also configure V-SW 751 to consume usage credits and/or apply policies for port X based on the token. LCP 761 also notifies logical network 771 and V-NIC 741 of the authenticated token. In this example, LCP 761 serves as the port authenticator, and both LCP 761 and logical network manager 704 serve as the logical port authentication database.

In a fourth operation, a user application transfers user data through the guest OS to V-NIC 751. V-NIC 751 transfers the user data to V-SW 751 per an authenticated logical port usage token. In a fifth operation, V-SW 751 detects use of an authenticated logical port usage token and transfers user data for V-NIC 741. V-SW 751 may apply policies and/or notify LCP 761 of the data transfer to enable token consumption or policy application by LCP 761. V-NIC 741 blocks user data transfers that do not have authenticated logical port usage tokens. V-NIC 741 may share tokens with other V-NICs or use multiple tokens itself.

Advantageously, computer system 700 avoids the need to use EAP authentication databases. Computer system 700 uses logical network manager 704 to interact with users and/or user machines to build logical networks. Computer system 700 uses logical network manager 704 and its API to serve-up logical port authentication services to multiple hypervisors. Logical network manager 704 may move logical port authentication context from one hypervisor to another as their virtual machines move about.

Figure 9:
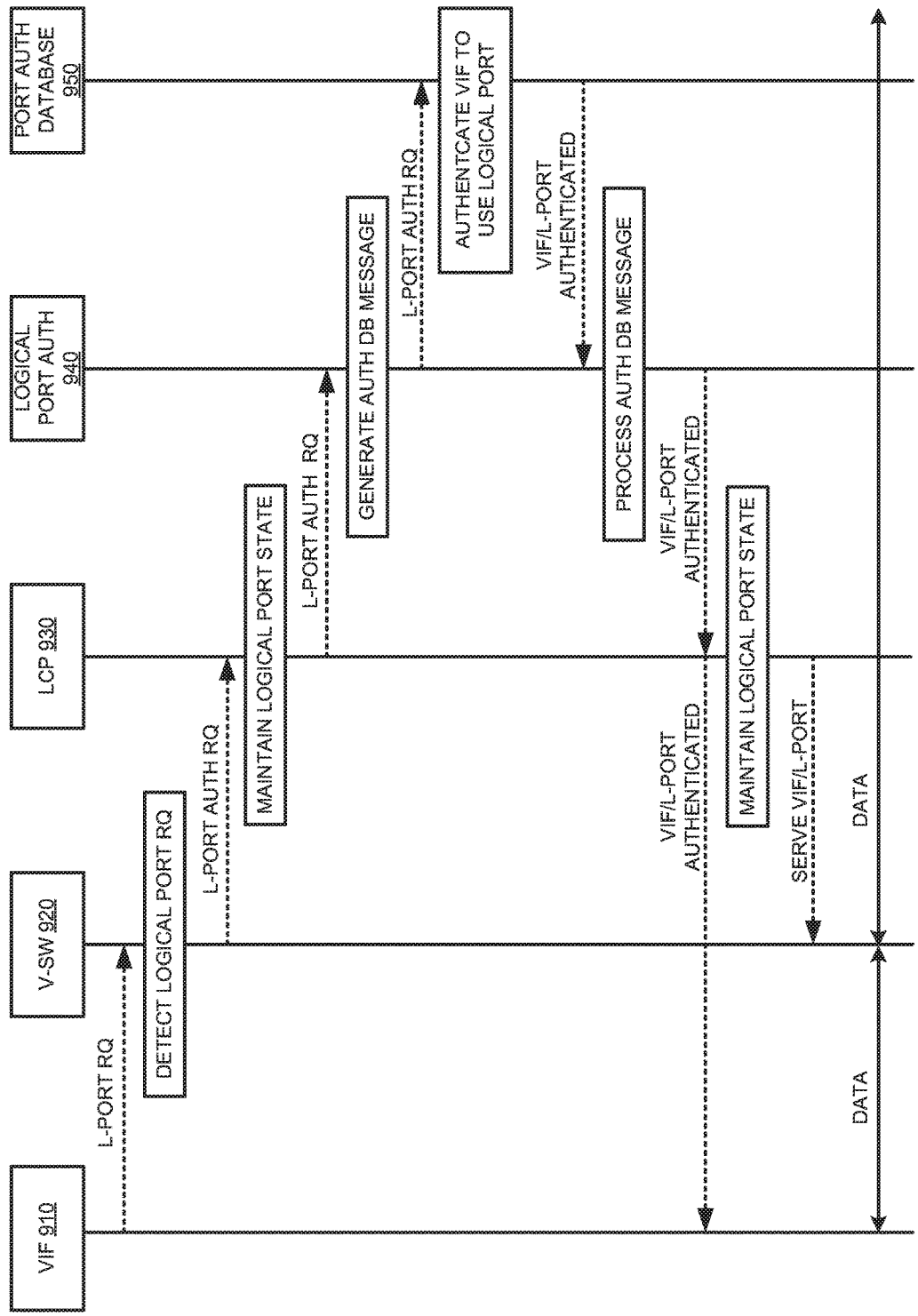
FIG. 9 illustrates an operation of a computer system to authenticate logical ports for virtual machines.

FIG. 9 illustrates an operation of computer system to authenticate a logical port for a VIF. FIG. 9 includes VIF 910, V-SW 920, LCP 930, logical port authenticator (logical port auth 940), and port authorization database 950. Prior to the operation, a logical network has been configured in a hypervisor that maintains logical network data for logical switches and logical ports. V-SW 920 identifies a logical port authentication request (L-PORT RQ) from VIF 910 for a logical port. V-SW 920 may detect an EAP bit string to perform this identification. V-SW 920 transfers the logical port authentication request to LCP 930.

LCP 930 maintains state for the logical port and changes the state for the requested logical port from closed to authenticating. LCP 930 transfers the logical port authentication request to logical port authenticator 940 that resides in the hypervisor or a logical network controller. Logical port authenticator 940 generates and transfers a logical port authentication request in an authentication database (AUTH DB) message formatted for port authentication database 950. The logical port authentication request may indicate VIF 910, the VIF MAC address, V-SW, and the specific logical port. It should also be understood that other identification information may also be provided in the authentication request in some examples.

Logical port authentication database 950 enters its data structures with the data provided in the request to determine authentication status for the logical port. If the data structures yield a positive result, then logical port authentication database 950 transfers a logical port authentication response indicating the authenticated VIF/logical port/V-SW combination and perhaps timers, counters, and policies to implement for the attachment. If the data structures yield a negative result, then the logical port authentication database transfers a logical port authentication response indicating the failure to authenticate the specific VIF/logical port/V-SW combination. In this example, the logical port is authenticated.

Logical port authenticator 940 receives a database message from logical port authentication database 950 having the logical port authentication response. Logical port authenticator 940 processes the database message to transfer the logical port authentication response to LCP 930, wherein LCP 930 configures V-SW 920 to serve VIF 910 when VIF 910 uses the authenticated logical port responsive to a positive authentication response. LCP 930 would let V-SW 920 continue to block user data for VIF 910 when using the logical port responsive to a negative response. LCP 930 notifies VIF 910 of the authentication response. LCP 930 maintains logical port state and changes the state to open based on the response. V-SW 920 transfers user data for VIF 910 when VIF 910 uses an authenticated logical port.

The computer systems described herein may use various data compute nodes, such as non-virtualized physical hosts, virtual machines, containers, and hypervisor kernel network interface modules. Virtual machines operate with their own guest operating systems on a host machine that is virtualized by software like a hypervisor or virtual machine monitor. The tenant, such as the owner of the virtual machine, may choose which applications to operate on the guest operating system. Containers run on the host operating system without the need for a hypervisor or a separate guest operating system. The host operating system uses name spaces to isolate the containers from each other. Therefore, the host operating system provides operating-system level segregation to groups of applications that operate within the different containers. This container segregation is like virtual machine segregation and is a form of virtualization. Hypervisor kernel network interface modules may include a network stack a with hypervisor kernel network interface and with receive/transmit threads. The hypervisor kernel network interface modules may use data compute nodes without virtual machines.

The above description and associated figures teach the best mode of the invention. To teach inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described above can be combined in various ways to form multiple variations of the invention. The invention is not limited to the specific examples described above, but only by the claims and their equivalents.

What is claimed is:

1. A method of operating a computer system to authenticate a logical port for a virtual machine, the method comprising:
   a virtual switch identifying a logical port authentication request for the virtual machine and transferring the logical port authentication request to a logical port authenticator;
   the logical port authenticator receiving the logical port authentication request, determining whether to grant the logical port authentication request based on an authentication database, and if granted, transferring authorization data for the logical port authentication request to the virtual switch; and
   the virtual switch transferring user data for the virtual machine when the virtual machine uses the logical port responsive to the authorization data.

2. The method of claim 1 wherein the logical port authenticator comprises a hypervisor.

3. The method of claim 1 wherein the logical port authenticator comprises a logical network controller.

4. The method of claim 1 wherein the authentication database comprises a logical network manager.

5. The method of claim 1 further comprising:
   a Local Control Plane (LCP) receiving the logical port authentication request transferred by the virtual switch and transferring the logical port authentication request for delivery to the logical port authenticator; and
   the LCP receiving the authorization data transferred by the logical port authenticator, and responsive to the authorization data, configuring the virtual switch to transfer the user data for the virtual machine when the virtual machine uses the logical port.

6. The method of claim 1 wherein:
   the virtual switch identifying the logical port authentication request for the virtual machine comprises the virtual switch identifying the logical port authentication request for a virtual network interface; and
   the virtual switch transferring the user data for the virtual machine when the virtual machine uses the logical port comprises the virtual switch transferring the user data for the virtual network interface when the virtual network interface uses the logical port.

7. The method of claim 1 wherein the virtual switch identifying the logical port authentication request for the virtual machine comprises the virtual switch identifying an Extensible Authentication Protocol (EAP) port authentication request.

8. The method of claim 1 further comprising receiving an authenticated usage token for the virtual machine from the authentication database, and wherein the virtual switch transferring the user data for the virtual machine when the virtual machine uses the logical port comprises the virtual switch consuming the authenticated usage token when the virtual machine uses the logical port.

9. The method of claim 1 further comprising:
   a hypervisor receiving virtual interface attachment data for the virtual machine;
   the hypervisor transferring the logical port authentication request responsive to the virtual interface attachment data;
   a Local Control Plane (LCP) receiving an authenticated usage token for the virtual machine transferred by a logical network manager; and
   the virtual switch consuming the authenticated usage token when the virtual machine uses the logical port.

10. The method of claim 1 wherein determining whether to grant the logical port authentication request based on the authentication database comprises determining whether to grant the logical port authentication request based on the authentication database, and virtual network interface data, virtual switch data, and logical port data associated with the logical port authentication request.

11. A computer apparatus to authenticate a logical port for a virtual machine, the computer apparatus comprising:
   virtual switch computer processing instructions configured to direct computer processing circuitry, when executed, to identify a logical port authentication request for the virtual machine and transfer the logical port authentication request to a logical port authenticator;

the logical port authenticator computer processing instructions configured to direct computer processing circuitry, when executed, to receive the logical port authentication request, determine whether to grant the logical port authentication request based on an authentication database, and if granted, transfer authorization data for the logical port authentication request to the virtual switch;

the virtual switch computer processing instructions further configured to direct the computer processing circuitry, when executed, to transfer user data for the virtual machine when the virtual machine uses the logical port responsive to the authorization data; and one or more non-transitory computer-readable storage media that stores the logical network computer processing instructions, the virtual switch computer processing instructions, and the logical port authenticator computer processing instructions.

12. The computer apparatus of claim 11 wherein the logical port authenticator computer processing instructions comprise hypervisor computer processing instructions.

13. The computer apparatus of claim 11 wherein the logical port authenticator computer processing instructions comprise logical network controller computer processing instructions.

14. The computer apparatus of claim 11 wherein the authentication database comprises a logical network manager.

15. The computer apparatus of claim 11 further comprising:

Local Control Plane (LCP) computer processing instructions configured to direct the computer processing circuitry, when executed, to receive the logical port authentication request transferred by the virtual switch, transfer the logical port authentication request for delivery to the logical port authenticator, receive the authorization data transferred by the logical port authenticator, and responsive to the authorization data, configure the virtual switch computer processing instructions to transfer the user data for the virtual machine when the virtual machine uses the logical port; and the one or more non-transitory computer-readable storage media stores the LCP computer processing instructions.

16. The computer apparatus of claim 11 wherein the virtual switch computer processing instructions are configured to direct the computer processing circuitry, when executed, to identify the logical port authentication request for a virtual network interface and transfer the user data for the virtual network interface when the virtual network interface uses the logical port.

17. The computer apparatus of claim 11 wherein the virtual switch computer processing instructions are configured to direct the computer processing circuitry, when executed, to identify an Extensible Authentication Protocol (EAP) port authentication request.

18. The computer apparatus of claim 11 further comprising:

logical network manager computer processing instructions configured to direct the computer processing circuitry, when executed, to receive the logical network data for a logical switch having the logical port and to generate usage tokens for the logical port; and the one or more non-transitory computer-readable storage media stores the logical network manager computer processing instructions.

19. The computer apparatus of claim 11 further comprising:

hypervisor computer processing instructions configured to direct the computer processing circuitry, when executed, to receive virtual interface attachment data for the virtual machine and automatically transfer the logical port authentication request responsive to the virtual interface attachment data;

Local Control Plane (LCP) computer processing instructions configured to direct the computer processing circuitry, when executed, to receive an authenticated usage token for the virtual machine transferred by a logical network manager;

the virtual switch computer processing instructions are configured to direct the computer processing circuitry, when executed, to consume the authenticated usage token when the virtual machine uses the logical port; and the one or more non-transitory computer-readable storage media stores the hypervisor computer processing instructions and the LCP computer processing instructions.

20. The computer apparatus of claim 11 wherein the computer processing instructions to determine whether to grant the logical port authentication request based on the authentication database direct the computer processing circuitry to determine whether to grant the logical port authentication request based on the authentication database, and virtual network interface data, virtual switch data, and logical port data associated with the logical port authentication request.

* * * * *